United States Patent
Tandjeu-Tchuissi

(10) Patent No.: US 11,529,992 B2
(45) Date of Patent: Dec. 20, 2022

(54) ASCERTAINING A ROTATIONAL ANGLE OF A STEERING SHAFT BY MEANS OF THREE TOOTHED GEARS

(71) Applicant: Valeo Schalter und Sensoren GmbH, Bietigheim-Bissingen (DE)

(72) Inventor: Landry Tandjeu-Tchuissi, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 503 days.

(21) Appl. No.: 16/607,530

(22) PCT Filed: Apr. 23, 2018

(86) PCT No.: PCT/EP2018/060261
§ 371 (c)(1),
(2) Date: Oct. 23, 2019

(87) PCT Pub. No.: WO2018/197372
PCT Pub. Date: Nov. 1, 2018

(65) Prior Publication Data
US 2020/0140013 A1    May 7, 2020

(30) Foreign Application Priority Data
Apr. 26, 2017    (DE) .......................... 102017108863.6

(51) Int. Cl.
*B62D 15/02*    (2006.01)
*G01D 5/12*    (2006.01)

(52) U.S. Cl.
CPC ........... *B62D 15/0215* (2013.01); *G01D 5/12* (2013.01)

(58) Field of Classification Search
CPC .............................. B62D 15/0215; G01D 5/12
(Continued)

(56) References Cited

U.S. PATENT DOCUMENTS 9,310,195 B2 *    4/2016    Stafford ................... G01D 5/04
9,528,855 B2    12/2016    Houda
(Continued)

FOREIGN PATENT DOCUMENTS

DE    19821467 A1    11/1999
DE    19941101 A1    3/2001
(Continued)

OTHER PUBLICATIONS

International Search Report and Written Opinion corresponding to International Application No. PCT/EP2018/060261, dated Jun. 28, 2018 (14 pages).
(Continued)

*Primary Examiner* — Aditya S Bhat
(74) *Attorney, Agent, or Firm* — Osha Bergman Watanabe & Burton LLP

(57) ABSTRACT

The invention relates to a method for ascertaining a rotational angle (E) of a shaft (2). In order to increase the accuracy of the ascertainment within a greater predefined angle range in relation to the prior art, the following steps are provided:
detecting respective rotational angles (W1, W2, W3) of three toothed gears (Z1, Z2, Z3) of a toothed gear arrangement, wherein the three toothed gears (Z1, Z2, Z3), with different numbers of teeth (z1, z2, z3), are meshed directly with a gear ring (10) of the shaft (2), and
ascertaining the rotational angle (E) of the shaft (2) on the basis of the respective rotational angles (W1, W2, W3) of the three toothed gears (Z1, Z2, Z3) in accordance with a predetermined extraction rule, wherein the rotational angle (E) of the shaft (2) is distinctly defined within a predefined angle range by the entirety of the respective rotational angles (W1, W2, W3).

14 Claims, 3 Drawing Sheets

(58) Field of Classification Search
USPC .......................................................... 702/151
See application file for complete search history.

(56) References Cited

U.S. PATENT DOCUMENTS

| | | |
|---|---|---|
| 2007/0090830 A1 | 4/2007 | Shiraga et al. |
| 2008/0307873 A1* | 12/2008 | Kang .................... G01D 5/145 |
| | | 73/117.02 |
| 2011/0043198 A1* | 2/2011 | Ruetz ................ B62D 15/0245 |
| | | 324/207.25 |

FOREIGN PATENT DOCUMENTS

| | | |
|---|---|---|
| DE | 10048911 C1 | 4/2002 |
| EP | 1193472 A2 | 4/2002 |
| EP | 1777484 A2 | 4/2007 |
| EP | 2259016 A1 | 12/2010 |
| EP | 2743662 A1 | 6/2014 |
| EP | 2789967 A1 | 10/2014 |
| FR | 2697081 A1 | 4/1994 |

OTHER PUBLICATIONS

German Search Report in corresponding German Application No. 10 2017 108 863.6, dated Nov. 29, 2017 (7 pages).

* cited by examiner

ASCERTAINING A ROTATIONAL ANGLE OF A STEERING SHAFT BY MEANS OF THREE TOOTHED GEARS

CROSS REFERENCE TO RELATED APPLICATIONS

This application is a national stage application, filed under 35 U.S.C. § 371, of International Patent Application No. PCT/EP2018/060261, filed on 23 April, 2018, which claims priority to German Patent Application No. 102017108863.6, filed on 26 April, 2017, the contents of which are herein incorporated by reference in their entirety.

The invention relates to a method for ascertaining a rotational angle of a steering shaft, wherein the rotational angle of the steering shaft is ascertained from respective rotational angles of multiple toothed gears. Further aspects of the invention relate to a control unit and to a measuring arrangement for ascertaining a rotational angle of a steering shaft. A fourth aspect of the invention relates to a motor vehicle with said shaft.

Methods for determining a rotational angle of a steering shaft are known from the prior art. For example, a main gear connected to the steering shaft drives two secondary toothed gears with different numbers of teeth. A respective rotational angle of the two secondary toothed gears can be detected by means of respective angle sensors. From the two rotational angles of the secondary gearwheels, the rotational angle of the steering shaft can be distinctly determined over multiple rotations by means of the Nonius principle. A similar arrangement is known for example from FR 269 70 81 A1.

For example, $z1$, $z2$ are the respective numbers of teeth of the secondary toothed gears $Z1$ and $Z2$, wherein $z1$ is smaller than $z2$ and $z1$ and $z2$ are coprime. The number of teeth of the main gear corresponds to I. A detectable angle range of the shaft may in this case amount to for example $z1 \cdot z2 \cdot 360 \div 1$. The greater $z1$ and $z2$ are, the greater is the detectable angle range, but the more accurate the angle sensors must be in order to avoid reduced accuracy. If $g1$ is the accuracy of a first angle sensor $S1$ that detects the movement of the secondary toothed gear $Z1$, an overall accuracy $G1$ of the rotational angle of the steering shaft is obtained from the formula $G1 = g1 \cdot z1 \div 1$. As it emerges from the formula, with $z1 \div 1$, the detectable angle range increases along with a deterioration in accuracy. This applies analogously to the secondary toothed gear $Z2$.

EP 2 743 662 A1 provides a device for a motor vehicle which is designed to distinctly determine an absolute rotational angle of a steering shaft even in the case of more than one full revolution. Here, a first assembly, which comprises two toothed gears, forms a revolution sensor, and a second assembly, which comprises one toothed gear, serves for the fine determination of the rotational angle.

The prior art has the disadvantage that an extent of angle range within which the rotational angle of the steering shaft is distinctly defined and an accuracy of the ascertainment of the rotational angle of the steering shaft are mutually restrictive.

It is an object of the invention to make the rotational angle of the steering shaft distinctly ascertainable with increased accuracy within a greater predefined angle range in relation to the prior art.

Said object is achieved according to the invention by means of the subjects of the independent patent claims. Advantageous embodiments with expedient refinements are the subject of the subclaims. Expedient refinements of the method according to the invention analogously also form refinements of the device according to the invention, and vice versa.

In the case of the present method for ascertaining a rotational angle of a steering shaft, in a first step, respective rotational angles of three toothed gears of a toothed gear arrangement are detected, wherein the three toothed gears, with different numbers of teeth, are meshed directly with a gear ring of the shaft. For example, the respective rotational angle is detected by means of a respective angle sensor. In particular, three rotational angles for each of the three toothed gears are detected. In particular, the three toothed gears, owing to the different numbers of teeth, rotate at respectively different angular speeds during a rotation of the shaft. "Directly meshed" means in particular that respective teeth of each of the three toothed gears engage directly into teeth of the gear ring.

In a second step, the rotational angle of the steering shaft is ascertained on the basis of the respective rotational angles of the three toothed gears in accordance with a predetermined extraction rule, wherein the rotational angle of the steering shaft is distinctly defined within a predefined angle range by the entirety of the respective rotational angles. The predefined angle range encompasses in particular multiple complete revolutions of the shaft. The three respective rotational angles of the three toothed gears may be regarded as a tuple, in particular as a triplet. By means of the entirety of the respective rotational angles or by means of the tuple, the rotational angle of the steering shaft can be distinctly assigned to the shaft within the predefined angle range. The assignment of the rotational angle of the steering shaft in a manner dependent on the entirety of the respective rotational angles and/or in a manner dependent on the tuple may be performed for example on the basis of a value table. The predetermined extraction rule may thus comprise that the rotational angle of the steering shaft is ascertained, on the basis of the entirety of the respective rotational angles, from the value table.

The rotational angle of the steering shaft may be measured over multiple revolutions. For example, the rotational angle of the steering shaft lies between 0 degrees and a multiple of 360 degrees, for example 3600 degrees, which corresponds to 10 full revolutions. The respective rotational angles the three toothed gears are in particular in relation to the present revolution of the respective toothed gear. Thus, the rotational angles of the three toothed gears preferably always lie in a range between 0 degrees and 360 degrees.

One refinement provides that the predetermined extraction rule comprises that, within the three toothed gears, two different toothed gear pairings are selected, wherein a first toothed gear of the three toothed gears is comprised in both of the two toothed gear pairings. Here, by means of the respective rotational angle of the two toothed gear pairings, a number of complete revolutions of the first toothed gear is distinctly ascertainable in a respective partial angle range. For example, a first toothed gear pairing of the two toothed gear pairings comprises the first toothed gear and a second toothed gear of the three toothed gears, and a second toothed gear pairing of the two toothed gear pairings comprises the first toothed gear and a third toothed gear of the three toothed gears. The number of complete revolutions of the first toothed gear in a first partial angle range of the first toothed gear pairing may be distinctly ascertainable by means of a first rotational angle of the first toothed gear and a second rotational angle of the second toothed gear. The number of complete revolutions of the first toothed gear in a second partial angle range of the second toothed gear pairing may be distinctly ascertainable by means of the first rotational angle of the first toothed gear and a third rotational angle of the third toothed gear. Through selection of the two toothed gear pairings, the number of complete revolutions of the first toothed gear can be ascertained particularly easily because, in this case, an extraction rule, known from the prior art, for ascertaining the rotational angle of the steering shaft on the basis of two toothed gears can be ascertained for the respective toothed gear pairings. The number of complete revolutions of a toothed gear indicates in particular how many revolutions of in each case 360 degrees the respective toothed gear has turned proceeding from a zero position. For example, the number of complete revolutions of a toothed gear corresponds to an absolute angle of the respective toothed gear, which indicates in particular the angle of the toothed gear relative to the zero position over multiple revolutions, divided by 360 degrees.

One refinement provides that a first value for the number of complete revolutions of the first toothed gear is ascertained from the respective rotational angles of the toothed gears of the first toothed gear pairing of the two toothed gear pairings, and a second value for the number of complete revolutions of the first toothed gear is ascertained from the respective rotational angles of the toothed gears of the second toothed gear pairing of the two toothed gear pairings. The first value and the second value for the number of complete revolutions of the first toothed gear may be equal or may differ from one another. In particular, the first value and the second value deviate from one another in particular only if the number of complete revolutions of the first toothed gear lies outside a or outside both of the respective partial angle ranges. In this case, the number of complete revolutions of the first toothed gear is not distinctly determinable by means of the toothed gear pairings individually. In particular, the first value for the number of complete revolutions of the first toothed gear can be ascertained from the first rotational angle and the second rotational angle. In particular, the second value for the number of complete revolutions of the first toothed gear can be ascertained from the first rotational angle and the third rotational angle.

One refinement provides that the first value and the second value for the number of complete revolutions of the first toothed gear are ascertained in each case by means of the Nonius principle. In particular, the first value for the number of complete revolutions of the first toothed gear for the first toothed gear pairing is ascertained by means of the Nonius principle. Preferably, the second value for the number of complete revolutions of the first toothed gear for the second toothed gear pairing is ascertained by means of the Nonius principle. By means of the Nonius principle, a simple and distinct extraction rule is provided for ascertaining the first value and the second value for the number of complete revolutions of the first toothed gear for the respective toothed gear pairing.

One refinement provides that a first predetermined addition value is added to the first value if the first value is lower than the second value, and a second predetermined addition value is added to the second value if the second value is lower than the first value, and the respective predetermined addition values are added iteratively to the first value and the second value until the first value and the second value correspond. Preferably, the first/second value is varied by adding the first/second predetermined addition value in the context of an iteration loop. Preferably, the iteration loop provides for the respective predetermined addition value to be added to the respective smaller one of the two values. In particular, in each iteration step, it is checked which of the two values is smaller than the other in the present iteration step. The iteration loop may be stopped as soon as the first value and the second value correspond.

One refinement provides that the first and the second predetermined addition value relate to a span of the respective partial angle range within which the number of complete revolutions of the first toothed gear is distinctly ascertainable by means of the first and the second toothed gear pairing respectively. In particular, the first addition value indicates a span of the partial angle range within which the number of complete revolutions of the first toothed gear is distinctly ascertainable by means of the first toothed gear pairing. Alternatively or in addition, the second predetermined addition value indicates a span of the partial angle range within which the number of complete revolutions of the first toothed gear is distinctly ascertainable by means of the second toothed gear pairing. The respective predetermined addition value preferably corresponds to a number of complete revolutions of the first toothed gear that the first toothed gear can distinctly perform within the partial angle range of the first toothed gear pairing. For example, the second predetermined addition value corresponds to a number of complete revolutions of the first toothed gear that the first toothed gear can distinctly perform within the partial angle range of the second toothed gear pairing.

One refinement provides that the first value and/or the second value are defined as the number of complete revolutions of the first toothed gear only if the first value and the second value correspond. For example, the first value and the second value correspond directly after the ascertainment of the respective values from the respective rotational angles of the toothed gears of the respective toothed gear pairing. In this case, the number of complete revolutions of the first toothed gear may lie within the respective partial angle range of the two toothed gear pairings. For example, the first value and the second value correspond after the iterative addition of the respective predetermined addition values. In both cases, the first and/or the second value for the number of complete revolutions of the first toothed gear may correspond to the actual number of complete revolutions of the first toothed gear. Thus, the number of complete revolutions of the first toothed gear is distinctly ascertained from the first toothed gear pairing and the second toothed gear pairing.

One refinement provides that the rotational angle of the first toothed gear and the number of complete revolutions of the first toothed gear are combined to give a total angle of the first toothed gear, and the rotational angle of the steering shaft is ascertained from the total angle of the first toothed gear. For example, the number of complete revolutions of the first toothed gear is multiplied by 360 degrees, and the rotational angle of the first toothed gear is subsequently added in order to form the total angle of the first toothed gear. The total angle of the first toothed gear may be in a predetermined ratio in relation to the rotational angle of the steering shaft. Utilizing the predetermined ratio, the rotational angle of the steering shaft can be ascertained from the total angle of the first toothed gear.

One refinement of the invention provides that that toothed gear which has the smallest number of teeth of the three toothed gears is selected as the first toothed gear. In particular, that toothed gear whose number of teeth is smallest in relation to the other of the three toothed gears is selected as the first toothed gear. In particular, the second toothed gear and the third toothed gear each have a number of teeth which is greater than the number of teeth of the first toothed gear.

One refinement provides that a plausibility of the rotational angle of the steering shaft is checked by comparing the ascertained rotational angle of the steering shaft with a predefined rotational angle range, wherein the predefined rotational angle range is greater at least by a factor of 2 than the predefined rotational angle range within which the shaft is movable. In other embodiments, the predefined angle range may be greater at least by a factor of 3, 4, 5, 8, 10, 15, 20 or 50 than the predefined rotational angle range within which the shaft is movable. In other words, the angle range within which the rotational angle of the steering shaft can be distinctly defined by means of the entirety of the respective rotational angles of the three toothed gears is greater, at least by the respective factor, than the predefined rotational angle range within which the shaft is actually movable. If the ascertained rotational angle of the steering shaft lies outside the predefined rotational angle range, it can be inferred that the rotational angle of the steering shaft has been erroneously ascertained. In this case, the ascertained rotational angle of the steering shaft is not plausible. The greater the factor by which the predefined angle range is greater than the predefined rotational angle range, the greater is the likelihood that the ascertained rotational angle of the steering shaft, in the event of erroneous ascertainment thereof, lies outside the predefined rotational angle range. Errors in the ascertainment of the rotational angle of the steering shaft can thus be identified particularly reliably. This possibility for identifying the plausibility is made possible for the first time by the greater predefined angle range, in relation to the prior art, in which the rotational angle of the steering shaft is distinctly measurable.

The present invention furthermore includes a control unit for ascertaining a rotational angle of the steering shaft, which control unit is configured to carry out a method according to any of the preceding claims. In particular, the control unit has a receiver unit for detecting the respective rotational angle of the three toothed gears from three angle sensors.

A third aspect of the invention relates to a measuring arrangement for ascertaining a rotational angle of the steering shaft. The measuring arrangement comprises a gear ring which is arrangeable on the shaft, a toothed gear arrangement comprising three toothed gears which are mechanically operatively connected with different transmission ratios to the gear ring, and two angle sensors for detecting a respective rotational angle of a first and a second of the three toothed gears.

In order to make the rotational angle of the steering shaft distinctly ascertainable with increased accuracy within a greater predefined angle range in relation to the prior art, the measuring arrangement comprises a third angle sensor for detecting a third rotational angle of a third of the three toothed gears. Furthermore, each of the three toothed gears, with different numbers of teeth, is directly meshed with the gear ring.

One refinement of the measuring arrangement provides that said measuring arrangement furthermore comprises the control unit mentioned above. The angle sensors may be designed to transmit the respective detected rotational angle to the receiver unit of the control unit.

The measuring arrangement may be part of a steering device, wherein the gear ring is arranged on a steering shaft of the steering device. In particular, the gear ring has an external toothing. Preferably, the gear ring is arranged on the steering shaft rotationally symmetrically with respect to an axis of rotation of the steering shaft. In particular, the steering shaft is formed as a steering shaft of a vehicle. In this case, a steering angle of the vehicle can be ascertained from the rotational angle of the steering shaft.

The measuring arrangement may be part of a driver assistance device which is configured to carry out a method for ascertaining a rotational angle of a steering shaft of the above-stated type. For example, the driver assistance device comprises an electronic stability programme, ESP for short, which requires the rotational angle of the steering shaft of the vehicle as an input variable.

The invention furthermore includes a motor vehicle having the measuring arrangement mentioned above. In particular, the steering shaft is formed as a steering shaft of the motor vehicle. The rotational angle of the steering shaft is preferably linked to a turn angle of wheels of the motor vehicle. In this case, the turn angle of the wheels can be inferred from the rotational angle of the steering shaft.

Further features of the invention will emerge from the claims, from the figures and from the description of the figures. The features and feature combinations mentioned above in the description and the features and feature combinations mentioned below in the description of the figures and/or shown in the figures alone are usable not only in the respectively specified combination but also in other combinations without departing from the scope of the invention. Thus, embodiments of the invention which are not explicitly shown and discussed in the figures but which emerge and can be generated by means of separated combinations of features from the discussed embodiments are also to be regarded as being included and disclosed. Embodiments and feature combinations which thus do not have all of the features of an originally formulated independent claim are thus also to be regarded as being disclosed. Furthermore, embodiments and feature combinations which go beyond or deviate from the feature combinations set out in the back-references of the claims are to be regarded as being disclosed, in particular by the embodiments discussed above.

Figure 1:
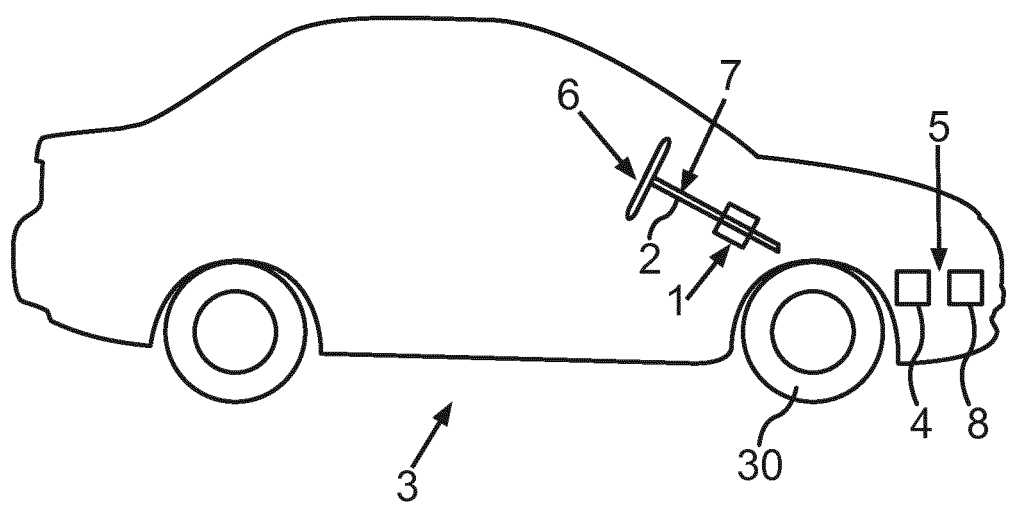
FIG. 1 shows, in a schematic side view, a vehicle having a steering shaft and a measuring arrangement for ascertaining a rotational angle of the steering shaft.

FIG. 1 shows, in a schematic side view, a vehicle 3, in particular a motor vehicle, preferably a motor car, for example a passenger motor car or a heavy goods vehicle. The vehicle 3 has, in the present case, one or more steerable wheels 30, in particular two front wheels of the vehicle 3. A turn angle of the steerable wheel 34 or of the steerable wheels 30 is controllable in particular by means of a steering device 7. In the present case, the steering device 7 comprises a steering wheel 6, which can be rotated by a driver of the vehicle 3, and a steering shaft 2, which in the present case is formed as the steering shaft of the vehicle 3. At the steering shaft 2, there is arranged a measuring arrangement 1 for ascertaining a rotational angle E of the steering shaft 2. The rotational angle E of the steering shaft 2 may directly correlate with the turn angle of the steerable wheel 30, for example with a proportionality factor. The measuring arrangement 1 furthermore comprises, in the present case, a control unit 4 which is designed to carry out a method for ascertaining the rotational angle E of the steering shaft 2.

The measuring arrangement 1 may be comprised by driver assistance system 5. For example, the driver assistance system 5 comprises a further control unit 8 for providing a driver assistance function. The driver assistance function is for example an electronic stability programme, ESP for short, a servo steering system, or an active steering system, which provides steering assistance in a manner dependent on the rotational angle E of the steering shaft 2.

Figure 2:
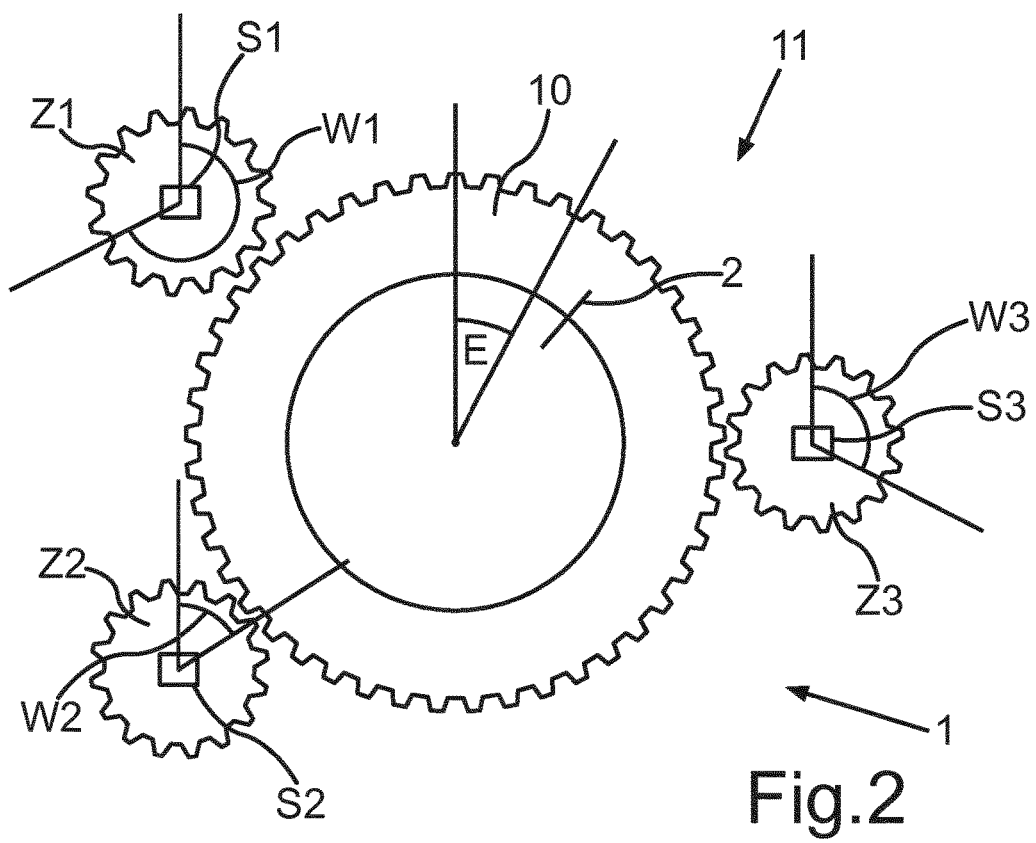
FIG. 2 shows the measuring arrangement in a section through the steering shaft.

FIG. 2 shows the measuring arrangement 1 in a cross section through the shaft 2. The control unit 4 is not shown in FIG. 2. A gear ring 10 is arranged on the shaft 2. The gear ring 10 is designed in the manner of a toothed gear, preferably in the manner of a spur gear. Radially on the outside, the gear ring 10 has teeth, wherein a number of teeth I of the gear ring 10 indicates the quantity of teeth of the gear ring 10. The gear ring 10 is in the present case directly meshed with three further toothed gears Z1, Z2, Z3. Each of the three toothed gears Z1, Z2, Z3 has, radially on the outside, teeth with a respective number of teeth. In particular, the three toothed gears Z1, Z2, Z3 are designed as spur gears. The three toothed gears Z1, Z2, Z3 are directly meshed with the gear ring 10, wherein directly means in particular that at least one respective tooth of each of the three toothed gears Z1, Z2, Z3 engages with a respective tooth of the gear ring 10. Preferably, the three toothed gears Z1, Z2, Z3 are meshed independently of one another with the gear ring 10. The three toothed gears Z1, Z2, Z3 form, together with the gear ring 10, a toothed gear arrangement 11.

Each of the three toothed gears Z1, Z2, Z3 is assigned a respective angle sensor S1, S2, S3. For example, the angle sensors S1, S2, S3 are arranged at the respective toothed gear Z1, Z2, Z3. A first angle sensor S1 may be designed to detect a first rotation angle W1 of a first toothed gear Z1. A second angle sensor S2 may be designed to detect a second rotational angle W2 of a second toothed gear Z2. A third angle sensor S3 may be designed to detect a third rotational angle W3 of a third toothed gear Z3. The rotational angle E of the steering shaft 2 is distinctly defined by the respective rotational angles W1, W2, W3 of the three toothed gears Z1, Z2, Z3. The three rotational angles W1, W2, W3 indicate in particular the present angle of the respective toothed gear Z1, Z2, Z3 in relation to a zero position. The value range of the three rotational angles W1, W2, W3 is in this case in particular 0 degrees to 360 degrees. The rotational angle E of the steering shaft 2 is, by contrast, ascertainable over multiple complete revolutions. The rotational angle E of the steering shaft 2 shown in FIG. 2 may accordingly correspond to, for example, 30°, 390° or 750°. The respective number of teeth of the three toothed gears Z1, Z2, Z3 is in each case different. In other words, it is preferable for each of the three toothed gears Z1, Z2, Z3 to have a different number of teeth. For example, a number of teeth z2 of the second toothed gear Z2 is greater than a number of teeth z1 of the first toothed gear Z1. For example, a number of teeth z3 of the third toothed gear Z3 is greater than the number of teeth z2 of the second toothed gear Z2.

Figure 4:
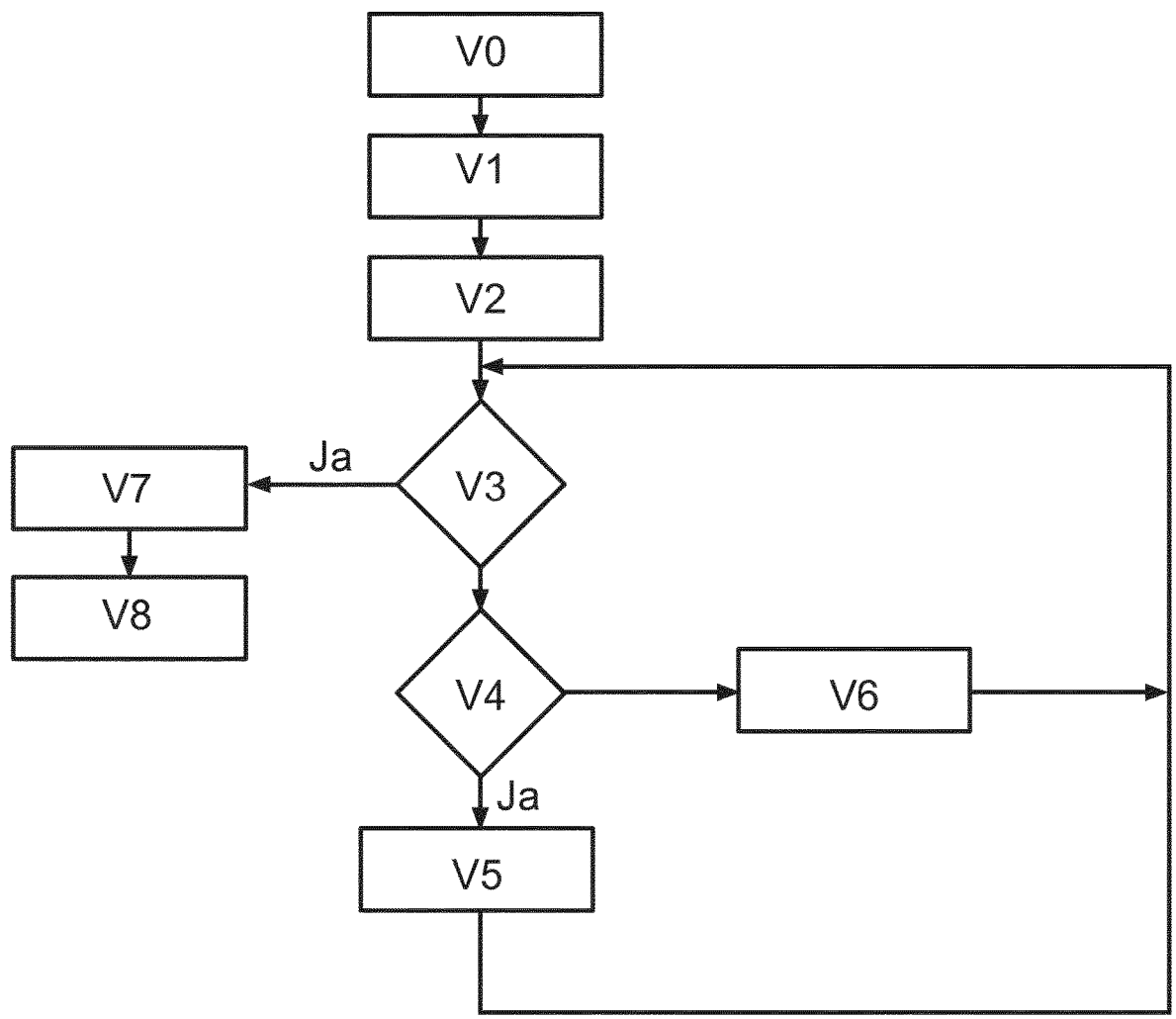
FIG. 4 shows an exemplary flow diagram of a method for ascertaining a rotational angle of a steering shaft.

FIG. 4 shows, in a flow diagram, an exemplary sequence of method steps of a method for ascertaining the rotational angle E of the steering shaft 2. The control unit 4 is preferably configured to carry out one, multiple or all of the method steps discussed below. In a step V0, two different toothed gear pairings (Z1, Z2 and Z1, Z3) are selected within the three toothed gears Z1, Z2, Z3. The first toothed gear Z1 is in this case in particular comprised in both of the toothed gear pairings (Z1, Z2), (Z1, Z3). For example, the first toothed gear pairing (Z1, Z2) comprises the first toothed gear Z1 and the second toothed gear Z2. For example, the second toothed gear pairing (Z1, Z3) comprises the first toothed gear Z1 and the third toothed gear Z3.

In a step V1, in particular by means of a Nonius algorithm, a number U1 of complete revolutions of the first toothed gear Z1 is ascertained from the first toothed gear pairing (Z1, Z2). For this purpose, the following formula 1 may be applied, wherein A1 denotes a number A1 of complete revolutions of the second toothed gear Z2 from the first toothed gear pairing (Z1, Z2):

$$z1 \cdot U1 z2 \cdot A1 = (z2 \cdot W2 - z1 \cdot W1) \div 360° \qquad \text{Formula 1}$$

For the above-stated formula 1, a solution is sought which is greater than 0 and less than z2. With this secondary condition, the formula 1 can be distinctly solved despite the inclusion of two unknowns (U1, A1). In particular, the number U1 of complete revolutions of the first toothed gear Z1 is distinctly ascertainable from the first toothed gear pairing (Z1, Z2) if it is greater than 0 and less than z2. The number of complete revolutions of a toothed gear Z1, Z2, Z3 indicates in particular how many revolutions of in each case 360 degrees the respective toothed gear has turned proceeding from a zero position. For example, the number of complete revolutions of a toothed gear corresponds to an absolute angle of the respective toothed gear, which indicates in particular the angle of the respective toothed gear with respect to a zero position over multiple revolutions, divided by 360 degrees. By means of formula 1, the number of complete revolutions is ascertainable in a partial angle range which corresponds to, for example, z2·360°.

In a step V2, in particular by means of a Nonius algorithm, a number U2 of complete revolutions of the first toothed gear Z1 is ascertained from the second toothed gear pairing (Z1, Z2). For this purpose, the following formula 2 may be applied, wherein A2 denotes a number A2 of complete revolutions of the third toothed gear Z3 from the second toothed gear pairing (Z1, Z3):

$$z1 \cdot U2 z3 \cdot A2 = (z3 \cdot W3 - z1 \cdot W1) = 360 \qquad \text{Formula 2}$$

For the above-stated formula 2, a solution is sought which is greater than 0 and less than z3. With this secondary condition, the formula 2 can be distinctly solved despite the inclusion of two unknowns (U2, A2). In particular, the number U2 of complete revolutions of the first toothed gear Z1 is distinctly ascertainable from the second toothed gear pairing (Z1, Z3) if it is greater than 0 and less than z3. By means of formula 2, the number of complete revolutions is ascertainable in a partial angle range which corresponds to, for example, z3·360°.

In a third step V3, it is checked whether U1 and U2 are equal. If this is the case, the method continues in a step V7. In the step V7, U1 and/or U2 can be defined as the number U of complete revolutions of the toothed gear Z1, if both are equal.

In a step V4, it may be checked whether U1 is greater than U2 or whether U2 is greater than U1. Depending on the result of the check, the method is continued either with a step V5 will with a step V6. In the present case, the method is continued with the step V5 if U1 is greater than U2. In the present case, the method is continued with the step V6 if U2 is greater than U1.

In the step V5, a second predetermined addition value, in the present case z3, is added to U2. This may thus yield a new value for U2, specifically in the present case U2=U2+ z3. In the step V6, a second predetermined addition value, in the present case z3, is added to U1. This may thus yield a new value for U1, specifically in the present case U1=U1+ z2. The first and the second predetermined addition value predefine in particular the maximum number of revolutions for the first toothed gear Z1 that is detectable in the respective partial angle ranges of the toothed gear pairings (Z1, Z2), (Z1, Z3). The method is subsequently continued with the step V3, wherein the value for U1 or U2 may have changed in relation to the first execution of the step V3. The steps V3 to V6 may be performed iteratively until U1 and U2 are equal. In particular, in the steps V5 and V6, the respective addition value is added iteratively to U1 and/or U2 until U1 and U2 are equal.

By means of the iterative addition, the number U of complete revolutions of the toothed gear Z1 can be ascertained over an angle range which is greater than the partial angle ranges of the toothed gear pairings (Z1, Z2), (Z1, Z3). The number U of complete revolutions of the toothed gear Z1 can, by means of formula 3, relate directly to the rotational angle E of the steering shaft 2:

$$E = (W1 + U \cdot 360°) \cdot \frac{z1}{l} \quad \text{Formula 3}$$

The selection of the three toothed gears as Z1, Z2, Z3 is to be understood merely as an example. In particular, each of the three toothed gears Z1, Z2, Z3 may be selected as first toothed gear Z1 or as second toothed gear Z2 or as third toothed gear Z3. Preferably, that one of the toothed gears Z1, Z2, Z3 which has the smallest number of teeth z1 is selected as the first toothed gear Z1 within the meaning of the above formulae. In this case, an accuracy of the ascertainment of the rotational angle E of the steering shaft 2 can be increased.

In order to further increase the accuracy, and/or in order to identify measurement errors in the ascertainment of the rotational angle E of the steering shaft 2, the steps V0 to V7 can be performed independently for two or more different toothed gear pairings. Exemplary toothed gear pairings are: (Z1, Z2) and (Z2, Z3) or (Z1, Z3) and (Z2, Z3). For example, the rotational angle E of the steering shaft 2 is alternatively or additionally ascertained, analogously to the steps V0 to V7, from the toothed gear pairings (Z1, Z3) and (Z2, Z3). The formulae must be correspondingly adapted to the toothed gear pairings (Z1, Z3) and (Z2, Z3). The two differently ascertained values for the rotational angle E of the steering shaft 2 can be compared. In the event of a deviation of the values, it can be decided that a measurement error is present.

Figure 3:
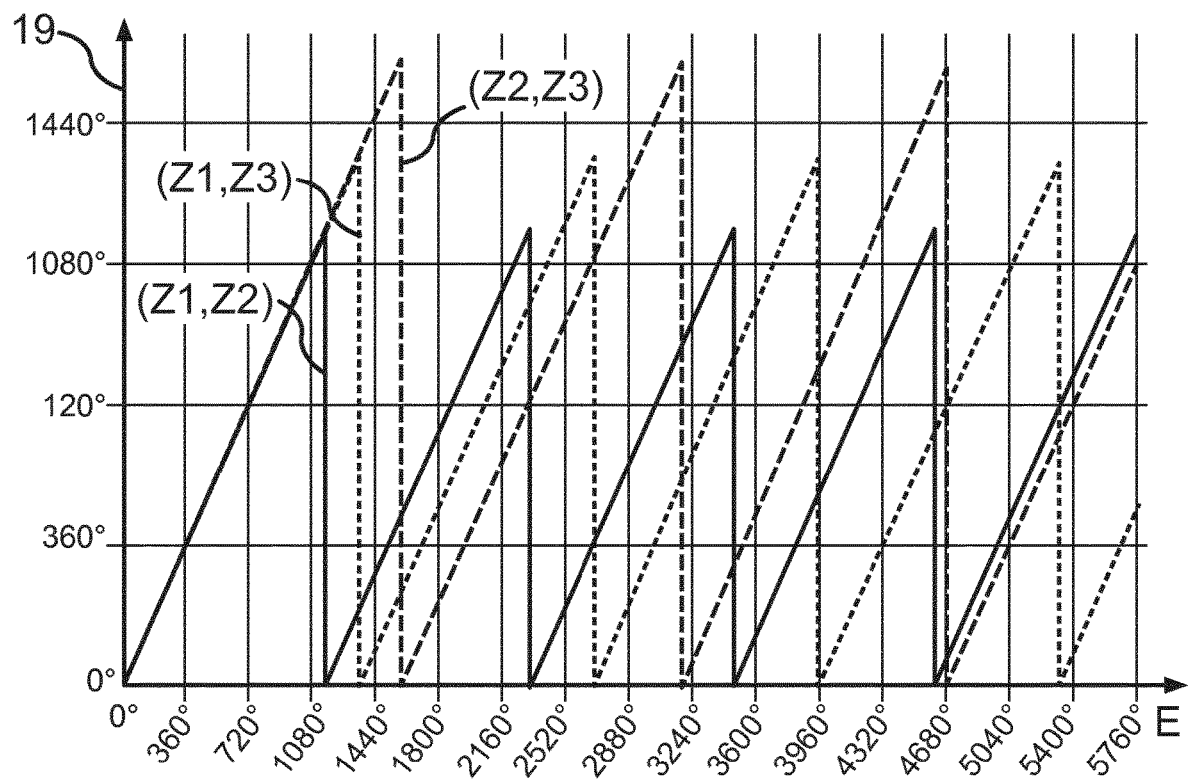
FIG. 3 shows a graph with the rotational angles, ascertained by means of three toothed gear pairings, of a steering shaft for multiple actual rotational angles of the steering shaft.

FIG. 3 shows a graph with the rotational angles 19, ascertained by means of the three toothed gear pairings (Z1, Z2), (Z2, Z3) and (Z1, Z3), of the shaft 2 for multiple rotational angles E of the steering shaft 2. All three graphs start at the origin of the graph and rise with increasing rotational angle E of the steering shaft 2. As soon as the rotational angle E departs from a respective partial angle range of one of the toothed gear pairings (Z1, Z2), (Z2, Z3) and (Z1, Z3), the respective graph falls to an ascertained rotational angle 19 of 0°. It is thus for example the case that the rotational angles E of the steering shaft 2 of 360 degrees and 1800 degrees are not distinguishable on the basis of a single one of the toothed gear pairings (Z1, Z2), (Z2, Z3) and (Z1, Z3). Since, however, the three toothed gear pairings (Z1, Z2), (Z2, Z3) and (Z1, Z3) indicate different values for the rotational angle E of the steering shaft 2 outside the respective partial angle ranges, the actual rotational angle E of the steering shaft 2 can be inferred from this. The steps V0 to V7 thus provide a method which utilizes this realization and by means of which the rotational angle E of the steering shaft 2 can be ascertained particularly easily.

A predefined angle range in which the rotational angle E of the steering shaft 2 is distinctly ascertainable can to a predefined factor, in particular by a factor of 2, 3, 4, 5, 8, 10, 15, 20 or 50, than a predefined rotational angle range within which the steering shaft 2 is movable. Here, the predefined rotational angle range may for example correspond to seven full revolutions of the steering shaft 2, or 2520 degrees. The predefined angle range in which the rotational angle E of the steering shaft 2 is distinctly ascertainable may for example correspond to 10, 15, 20, 30, 50 or 100 revolutions of the steering shaft 2, or 3600 degrees, 5400 degrees, 7200 degrees, 10800 degrees, 18000 degrees or 36000 degrees. The ascertained rotational angle E of the steering shaft 2 can be compared with a predefined rotational angle range. Here, it is in particular checked whether the rotational angle E of the steering shaft 2 is plausible. If the ascertained rotational angle E of the steering shaft 2 lies outside the predefined rotational angle range, then it can be inferred that the rotational angle E of the steering shaft 2 has been erroneously ascertained. In this case, the ascertained rotational angle E is not plausible. The greater the factor by which the predefined angle range is greater than the predefined rotational angle range, the greater is the likelihood that the ascertained rotational angle E of the steering shaft 2, in the event of erroneous ascertainment thereof, lies outside the predefined rotational angle range. Errors in the ascertainment of the rotational angle E can thus be identified particularly reliably. This possibility for identifying the plausibility is made possible in particular by the greater predefined angle range, in relation to the prior art, in which the rotational angle E of the steering shaft 2 is distinctly measurable.

The invention claimed is:

1. A method for ascertaining a rotational angle of a steering shaft, the method comprising:
    detecting respective rotational angles of three toothed gears of a toothed gear arrangement, wherein the three toothed gears, with different numbers of teeth, are meshed with a gear ring of the steering shaft; and
    ascertaining the rotational angle of the steering shaft on the basis of the respective rotational angles of the three toothed gears in accordance with a predetermined extraction rule, wherein the rotational angle of the steering shaft is distinctly defined within a predefined angle range by the entirety of the respective rotational angles.

2. The method according to claim 1, wherein the predetermined extraction rule comprises that, within the three toothed gears, two different toothed gear pairings, are selected, wherein a first toothed gear of the three toothed gears is comprised in both of the two toothed gear pairings, and wherein, by means of the respective rotational angle of the two toothed gear pairings, a number of complete revolutions of the first toothed gear is distinctly ascertainable in a respective partial angle range.

3. The method according to claim 2, wherein:
    a first value for the number of complete revolutions of the first toothed gear is ascertained from the respective rotational angles of the toothed gears of a first toothed gear pairing of the two toothed gear pairings, and
    a second value for the number of complete revolutions of the first toothed gear is ascertained from the respective rotational angles of the toothed gears of a second toothed gear pairing of the two toothed gear pairings.

4. The method according to claim 3, wherein the first value and the second value for the number of complete revolutions of the first toothed gear are ascertained in each case by means of the Nonius principle.

5. The method according to claim 3, wherein a first predetermined addition value is added to the first value when the first value is smaller than the second value, a second predetermined addition value is added to the second value when the second value is smaller than the first value, and the respective predetermined addition values are added iteratively to the first value and the second value until the first value and the second value correspond.

6. The method according to claim 5, wherein the first and the second predetermined addition value relate to a span of the respective partial angle range within which the number of complete revolutions of the first toothed gear is distinctly ascertainable by the first and the second toothed gear pairing respectively.

7. The method according to claim 3, wherein the first value and/or the second value are defined as the number of complete revolutions of the first toothed gear only when the first value and the second value correspond.

8. The method according to claim 2, wherein characterized in that the rotational angle of the first toothed gear and the number of complete revolutions of the first toothed gear are combined to give a total angle of the first toothed gear, and the rotational angle of the steering shaft is ascertained from the total angle of the first toothed gear.

9. The method according to claim 2, wherein that toothed gear which has the smallest number of teeth of the three toothed gears is selected as the first toothed gear.

10. The method according to claim 1, wherein a plausibility of the rotational angle of the steering shaft is checked by comparing the ascertained rotational angle of the steering shaft with a predefined rotational angle range, wherein the predefined angle range is greater at least by a factor of 2 than the predefined rotational angle range within which the steering shaft is movable.

11. A control unit for ascertaining a rotational angle of a steering shaft, wherein the control unit is configured to carry out a method comprising:

detecting respective rotational angles of three toothed gears of a toothed gear arrangement, wherein the three toothed gears, with different numbers of teeth, are meshed with a gear ring of the steering shaft; and ascertaining the rotational angle of the steering shaft on the basis of the respective rotational angles of the three toothed gears in accordance with a predetermined extraction rule, wherein the rotational angle of the steering shaft is distinctly defined within a predefined angle range by the entirety of the respective rotational angles.

12. A measuring arrangement for ascertaining a rotational angle of a steering shaft, comprising:

a gear ring which is arrangeable on the steering shaft;

a toothed gear arrangement comprising three toothed gears which are mechanically operatively connected with different transmission ratios to the gear ring;

two angle sensors for detecting a respective rotational angle of a first and a second of the three toothed gears; and, a third angle sensor for detecting a third rotational angle of a third of the three toothed gears wherein each of the three toothed gears, with different numbers of teeth, is meshed with the gear ring.

13. The measuring arrangement according to claim 12, having a control unit for ascertaining a rotational angle of a steering shaft by:

detecting respective rotational angles of three toothed gears of a toothed gear arrangement, wherein the three toothed gears, with different numbers of teeth, are meshed with a gear ring of the steering shaft, and ascertaining the rotational angle of the steering shaft on the basis of the respective rotational angles of the three toothed gears in accordance with a predetermined extraction rule, wherein the rotational angle of the steering shaft is distinctly defined within a predefined angle range by the entirety of the respective rotational angles.

14. A vehicle having a measuring arrangement according claim 12.

* * * * *